(12) United States Patent
Attard et al.

(10) Patent No.: US 11,700,247 B2
(45) Date of Patent: Jul. 11, 2023

(54) SECURING A GROUP-BASED COMMUNICATION SYSTEM VIA IDENTITY VERIFICATION

(71) Applicant: Slack Technologies, Inc., San Francisco, CA (US)

(72) Inventors: Samuel Attard, Vancouver (CA); Felix Rieseberg, San Francisco, CA (US); Deani Hansen, Vancouver (CA); Jan Hannemann, Victoria (CA)

(73) Assignee: Slack Technologies, LLC, San Francisco, CA (US)

( * ) Notice: Subject to any disclaimer, the term of this patent is extended or adjusted under 35 U.S.C. 154(b) by 111 days.

(21) Appl. No.: 16/942,694

(22) Filed: Jul. 29, 2020

(65) Prior Publication Data
US 2021/0037000 A1 Feb. 4, 2021

Related U.S. Application Data

(60) Provisional application No. 62/880,550, filed on Jul. 30, 2019.

(51) Int. Cl.
*H04L 29/06* (2006.01)
*H04L 9/40* (2022.01)
(Continued)

(52) U.S. Cl.
CPC ............ *H04L 63/08* (2013.01); *G06F 21/316* (2013.01); *G06F 21/32* (2013.01); *G06N 20/00* (2019.01);
(Continued)

(58) Field of Classification Search
CPC ..... H04L 63/08; H04L 63/102; H04L 63/126; H04L 51/16; G06F 21/32; G06F 21/316; G06N 20/00; H04W 12/06
See application file for complete search history.

(56) References Cited

U.S. PATENT DOCUMENTS 11,228,490 B1 * 1/2022 Carroll ............... H04L 41/0856
2017/0070526 A1 * 3/2017 Bailey ................. H04L 63/1408
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
(Continued)

*Primary Examiner* — Tongoc Tran
(74) *Attorney, Agent, or Firm* — Lee & Hayes, P.C.

(57) ABSTRACT

Securing a group-based communication system may comprise identity verification of a user based on tracking an entity's interactions with a computing device associated with a user profile registered with the group-based communication system. The identity verification techniques may comprise capturing various inputs at a computing device associated with a user profile registered with the group-based communication system and storing and/or transmitting the inputs and/or interaction parameters quantifying features of the inputs to a security component of the group-based communication system. The security component may generate a data structure based at least in part on comparing the interaction parameters to historical interaction parameters and the data structure may be used to generate a trust score for verifying or denying the entity interacting with the computing device.

20 Claims, 9 Drawing Sheets

(51) Int. Cl.
*G06F 21/32* (2013.01)
*G06F 21/31* (2013.01)
*G06N 20/00* (2019.01)
*H04W 12/06* (2021.01)
*H04L 51/216* (2022.01)

(52) U.S. Cl.
CPC .......... *H04L 51/216* (2022.05); *H04L 63/102* (2013.01); *H04L 63/126* (2013.01); *H04W 12/06* (2013.01)

(56) References Cited

U.S. PATENT DOCUMENTS

2017/0206557 A1* 7/2017 Abrol .................... G06Q 50/01
2018/0287982 A1 10/2018 Draeger et al.
2019/0364131 A1* 11/2019 Rogynskyy ........ G06Q 30/0201

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2 013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019], Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9Md7d-9573-89d9598a4963/?context=1000516> (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019], Retrieved from the Internet: <URL: https://www.rfc-editor.org/rfc/rfc1459.txt>. (dated May 1993) 57 pages.
Ernie Smith, "Picking Up the Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

SECURING A GROUP-BASED COMMUNICATION SYSTEM VIA IDENTITY VERIFICATION

PRIORITY

This application claims priority to U.S. Provisional Application No. 62/880,550, filed Jul. 30, 2019, the entirety of which is incorporated by reference herein.

TECHNICAL FIELD

A communication platform can leverage a network-based computing system to enable users to exchange data. In an example, users of the communication platform can communicate with other users via communication channels (or "channels"). A communication channel, or other virtual space, can be a data route used for exchanging data between and among systems and devices associated with the communication platform. For example, a communication channel may be established between and among various user computing devices, allowing the user computing devices to communicate and share data between and among each other over one or more networks. That is, in some examples, the communication platform can be a channel-based messaging platform and/or hub for facilitating communication between and among users. In some examples, data associated with a communication channel can be presented via a user interface. In some examples, the user interface can present a data feed indicating messages posted to and/or actions taken with respect to a particular communication channel.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
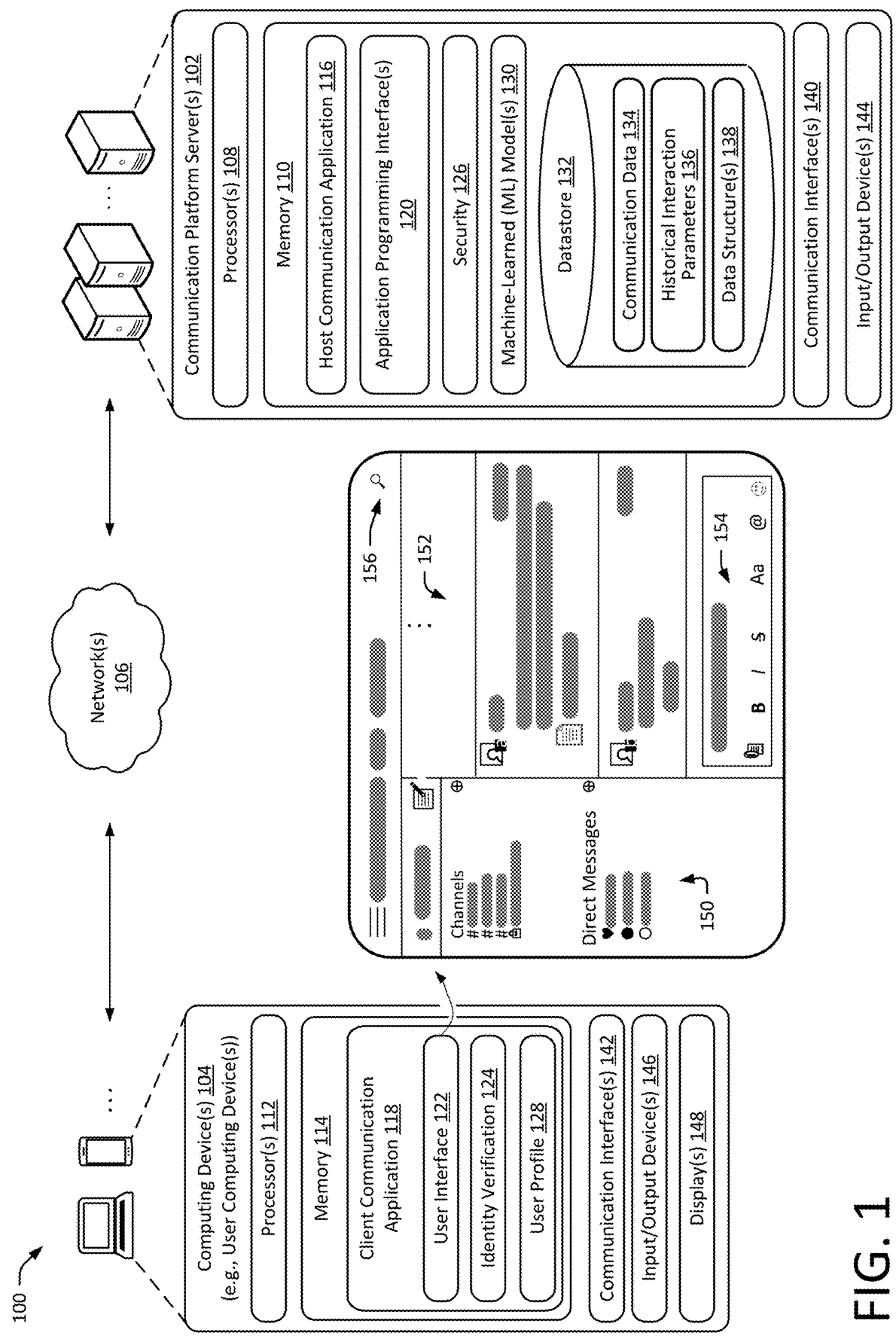
FIG. 1 illustrates an example environment and system infrastructure of a group-based communication system, in accordance with some embodiments of the present disclosure.

Techniques for securing a group-based communication system may comprise identity verification of a user based on tracking an entity's interactions with a computing device associated with a user profile registered with the group-based communication system. In some examples, the identity verification techniques discussed herein may comprise capturing various inputs at a computing device associated with a user profile registered with the group-based communication system and storing and/or transmitting the inputs, an identification of the inputs, and/or properties associated with the inputs in a data structure. This data structure is referred to herein as interaction data. In some examples, the techniques may comprise extracting one or more interaction parameters from the interaction data. The interaction parameters may characterize how the entity interacted with the computing device to cause the inputs at the computing device. For example, the interaction parameters may be related to a user transmitting messages to the group-based communication system utilizing a keyboard or touchscreen provided by the computing device (e.g., typing speed, typing pattern, common misspellings), recipients of a communication, time of day associated with the communication, channel or topic associated with the communication, etc. In some examples, a communication channel can be shared by two or more organizations, which can introduce privacy and security concerns. That is, because the communication channel is accessible to users who are part of different organizations (i.e., and, typically, are not privy to information outside of their own organizations), some organizations opt not to use shared communication channels because of such privacy and security concerns.

The techniques may additionally or alternatively comprise retrieving historical interaction parameters associated with the user profile, generating a data structure based at least in part on determining a difference between the recently generated interaction parameters and the historical interaction parameters, and generating a trust score associated with the interaction data based at least in part on the data structure. The techniques may comprise determining whether the trust score satisfies a trust score threshold. If the trust score satisfies the trust score threshold the security component may continue to monitor the computing device(s) associated with the user but, in some cases, the security component may allow the computing device(s), user interface(s), and/or application programing interface(s) (API(s)) to which the user profile has access to continue to operate in their full capacity without interrupting the entities user thereof (e.g., by causing the user interface to be populated with an identity verification process, by pausing the user's access to data stored in the group-based communication system servers or transmission of communications via the group-based communication system). The techniques may thereby reduce the frequency of interruptions of services provided by the group-based communication system for identity verification of the user, thereby improving the user's experience with the group-based communication system and increasing the uptime for the user's access to the group-based communication system).

If the trust score fails to satisfy the trust score threshold, a security component associated with the group-based communications system may initiate a trust verification process for further identity verification and/or may quarantine the user profile or particular computing device associated with the user profile (e.g., prevent at least one of the computing device(s) associated with the user profile from accessing data stored at the group-based communication system, transmitting messages over the group-based communication system, opening or continuing voice or video communications, etc; at least temporarily pause or terminate responses from an API to a computing device associated with the user profile) until the identity verification process is complete or abandoned. For example, the trust verification process may comprise a security component that transmits a trust verification request to the client device associated with the user profile or a verification device to receive further identity verification using a bot screening process, a period user verification process (e.g., requesting user to type code periodically or after a certain idle time calculated), a user biometric data verification process, an administrator approval process, and/or the like. The trust verification results generated after the trust verification process may be sent back to the systems as a trust verification response.

The systems structured in accordance with various embodiments of the disclosure may update the trust score based at least in part on the trust verification response and compare the updated trust score with the trust score threshold to more accurately determine whether impersonation activity occurred. If the updated trust score satisfies the trust score threshold, the computing device may be allowed to continue to access the group-based communication system, e.g., by un-quarantining the computing device and/or user profile and/or an identity confirmation notification may be transmitted to the computing device or an alternate communication mode associated with the user profile (e.g., email, text message, a different computing device associated with the user profile). If the updated trust score does not satisfy the trust score threshold, a protection action may be taken. For example, the computing device may be quarantined or continue to be quarantined and/or an identity fraud notification may be transmitted to the alternate communication mode associated with user profile and/or to the security component of the group-based communication system to improve the security level of the group-based communication system (e.g., by increasing a number of identity verification processes initiated, increasing a level of verification data required to passes the identity verification process). Various embodiments of the disclosure utilize a two-tiered identity confirmation mechanism, including an active interaction activity detection process and a trust verification process, so as to accurately detect impersonation activity and protect confidential or sensitive data being retrieved by client devices associated with malicious users.

Some methods may address identity verification through a single-tiered identity verification via a client device. Upon receiving a request to access a service provided the group-based communication system, such methods may request a user associated with the client device to provide login information (e.g., a user name and a password), or to verify user identity by providing biometric data (e.g., fingerprint data or facial recognition data), etc. However, these methods cannot solve situations when the user's login information or biometric data is stolen by a malicious user and utilized to access the system. Further, these methods can only provide entity verification at a first tier, no matter the complexity of that first tier (i.e., granting access when the login information or the biometric data matches the data stored in the databases, or denying access when the login information or the biometric data mismatches the data stored in the databases). In other words, such methods may leave the group-based communication system and/or user profile and/or data associated therewith completely open to security risks if this first tier is circumvented.

Systems structured in accordance with various embodiments of the disclosure overcome challenges faced by such methods by utilizing a two-tiered identity confirmation mechanism, which may continuously, semi-continuously, and/or periodically monitor activity associated with a user profile. For example, continuous monitoring may comprise generating interaction parameters and a trust score for any interaction with a computing device associated with a user profile, whereas semi-continuous monitoring may comprise generating interaction parameters and a trust score at key events (e.g., at login, upon joining a channel, upon inviting a user to a channel, upon messaging a user that the user profile has never messaged, upon downloading a file) and periodic monitoring may comprise generating the interaction parameters and trust score at defined time intervals (e.g., ever minute, every 5 minutes, every hour, every 12 hours, every day, every week) and/or input intervals (e.g., after 5 interactions, after 100 keystrokes, after 1 uploaded file, after 2 uploaded files).

The first tier of the identity confirmation mechanism may include an active interaction activity detection process to generate the trust score and comparing the generated trust score with a trust score threshold associated with the detected interaction activity. Based on the comparison, the systems structured in accordance with various embodiments of the disclosure may determine whether to initiate the second tier of the identity confirmation mechanism. This first tier may be built upon other tiers security or may be used as a standalone security method after a user has authenticated and/or generated enough historical interaction parameters for a baseline to be established.

In the active interaction activity detection process, multiple interaction activity features may be extracted from the detected interaction activity and compared to historical interaction activity features associated with similar interaction activities that are collected in history and stored in the databases. The historical interaction activity features provide multiple factors capturing the user's habits associated with a specific interaction activity and may be served as a baseline to detect whether there is an unusual interaction activity occurred.

The trust score is further used to compare with a trust score threshold that is associated with the current detected interaction activity. The trust score threshold may be set by the group-based communication system and may be set with different values associated with different interaction activities. Due to the scalable and adaptable nature for setting different trust score thresholds for different interaction activities, multiple trust levels can be provided In some examples of the present disclosure, which provides better security comparing to two trust levels (i.e., granting access or denying access) provided by conventional methods explained above. For example, the trust score threshold for the interaction activity related to accessing a public network or communication channel may have a higher value comparing to the interaction activity related to accessing a private network or communication channel, since public network is generally more vulnerable to malicious security attacks.

Once the trust score generated for the detected interaction activity is determined to be lower than the trust score threshold (i.e., an unusual interaction activity is detected), the systems structured in accordance with various embodiments of the disclosure may determine to initiate the second tier of the identity confirmation mechanism. The second tier of the identity confirmation mechanism includes a trust verification process.

Through utilizing two-tiered identity confirmation mechanism, the systems may provide adaptable multiple trust levels for different interaction activities that may be built on top of any existing systems (e.g., used in addition to and/or during an authentication attempt using credentials, biometrics, etc.) and/or used as an extension of existing systems (e.g., applying the techniques discussed herein after authentication). Specifically, the systems in the present disclosure utilizes certain features extracted from the detected interaction activities and historical features retrieved from historical interaction activities stored in databases to generate a trust score for initial impersonation detection. The techniques discussed herein may improve the security of data stored in and/or communications sent via the group-based communications system and may reduce latency between a security breach and quarantining a computing device associated with the breach. In some instances, the techniques may allow one or more computing devices from among multiple computing devices associated with a user profile to be quarantined, while at least one of the other of the multiple computing devices continues to be operable. In other words, a compromised computing device may be shut out the user of the compromised user profile may be notified while the user is still able to access the group-based communication profile via another computing device. Moreover, the techniques discussed herein may reduce a number or frequency of initiating interstitial identity verification processes that may interrupt use of the services provided by the group-based communication system.

As such, systems structured in accordance with various embodiments of the disclosure provide specific, technical solutions to technical problems faced by existing systems, the details of which are described herein.

Example System(S)

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates a block diagram of an example system 100 of computing devices usable to implement example techniques described herein. In at least one example, the example system 100 can be associated with a group-based communication platform that can leverage a network-based computing system to enable users of the communication platform to exchange data. Such a group-based communication platform may comprise a one or more computing devices performing services that are accessible to one or more client devices, and that are operable to provide access to a plurality of software applications related to operations of databases. In some examples, the group-based communication platform may take the form of one or more central servers disposed in communication with one or more additional servers running software applications and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifies, as described above, which can be associated with common access credentials, domains, or the like. In some examples, the communication platform can be a hub, offering a secure and private virtual space to enable users to chat, meet, call, collaborate, or otherwise communicate between or among each other. As described above, each group can be associated with a workspace, enabling users associated with the group to chat, meet, call, collaborate, or otherwise communicate between or among each other in a secure and private virtual space.

In some examples, the group-based communication platform is a channel-based messaging platform—in other words, channels of the communication platform may be central component of the manner of communicating and providing content via the communication platform. A channel may comprise a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. A channel may be associated with a channel identifier that refers to or associates one or more items of data by which a group-based communication channel may be uniquely identified. For example, a group-based communication channel identifier may comprise ASCII text, a pointer, a memory address, and the like.

Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel) and/or to determine context for the message (e.g., a description of the group-based communication channel, such as a description of a project discussed in the group-based communication channel, may be associated with the group-based communication channel identifier). In some examples, some channel(s) may be private such that access to such channels is restricted so that the channel(s) are not generally accessible and/or searchable by other members of the group-based communication system. For example, only those users and/or administrators whose user identifiers have been associated with a permission to access the channel may view, modify, etc. the private channel. To give access to such a channel, a group-based communication channel identifier for the private group-based communication channel may be associated with a user profile after the user has been validated/authenticated, allowing the user profile to view content of the private group-based communication channel.

In some examples, members of a group, and thus workspace, can be associated with a same organization. In some examples, members of a group, and thus workspace, can be associated with different organizations (e.g., entities with different organization identifiers). The group may be defined by common access credentials such as those of an organization or commercial enterprise. Access may further be facilitated by a validated request to join or an invitation to join transmitted by one group member user to another non-member user. Group identifiers may be used to associate data, information, messages, etc., with specific groups. For example, a group identifier may comprise ASCII text, a pointer, a memory address, and the like. A group identifier may be used to facilitate access control for a message (e.g., access to the message, such as having the message return as part of search results in response to a search query, may be restricted to those users having the group identifier associated with their user profile) and/or may be used to determine context for the message (e.g., a description of the group, such as the name of an organization and/or a brief description of the organization, may be associated with the group identifier).

The term "user" should be understood to refer to an entity such as an individual, group of individuals, business, organization, computing device, and/or the like; the users referred to herein are accessing a group-based communication or messaging system using client devices (as defined herein).

FIG. 1 illustrates an example system 100 for a group-based communication platform, which may comprise example computing devices including communication platform server(s) 102 and one or more computing devices 104 (e.g., user computing device(s)) associated with a first user, that interact over a network 106. By way of example and not limitation, the communication platform server(s) 102 may be representative of servers used to implement a communication platform system, the first computing device(s) 104 may be representative of user device(s) associated with a first user (i.e., a first "client device"). The user computing device(s) 104 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (JOT) device, or any other computing device capable of sending communications and performing the functions according to the techniques described herein.

The communication platform server(s) 102 may comprise one or more individual servers or other computing devices that may be physically located in a single central location or may be distributed at multiple different locations. The communication platform server(s) 102 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, cellular network, or any other such network, or any combination thereof. The network(s) 106 may comprise a single network or collection of networks, such as the Internet, a corporate intranet, a virtual private network (VPN), a local area network (LAN), personal area network (PAN), metropolitan area network (MAN), a wireless local area network (WLAN), a cellular network, a wide area network (WAN), a metropolitan area network (MAN), or a combination of two or more such networks, over which the user computing device(s) 104 may access the communication platform and/or communicate with other user computing device(s) via the communication platform. Components used for such communications can depend at least in part upon the type of network, the environment selected, or both. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

Each of the computing devices described herein may include one or more processors and/or memory. Specifically, in the illustrated example, communication platform server(s) 102 include one or more processors 108 and memory 110 and computing device(s) 104 include one or more processors 112 and memory 114. By way of example and not limitation, the processor(s) 108 and/or 112 may comprise one or more central processing units (CPUs), graphics processing units (GPUs), field-programmable gate arrays (FPGAs), and/or process-acceleration devices such as application-specific integrated circuits (ASICs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 110 and/or 114 may comprise one or more non-transitory computer-readable media and may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/flash-type memory, or any other type of memory capable of storing information. The architectures, systems, and individual elements described herein may include many other logical, programmatic, and physical components, of which those shown in the accompanying figures are merely examples that are related to the discussion herein. The memories 110 and/or 114 can be used to store any number of functional components that are executable by the processor(s) 108 and/or 112, respectively. In many implementations, these functional components comprise instructions or programs that are executable by the processor(s) 108 and/or 112 and that, when executed, specifically configure the processor(s) 108 and/or 112 to perform the actions attributed to the server(s) 102 and/or the computing device(s) 104, according to the discussion herein.

As shown in FIG. 1, communication platform server(s) 102 include a host communication application 116 and computing device(s) 104 includes client communication application 118 that enables interaction of content via the communication platform server(s) 102 among one or more computing devices associated via the communication platform. For example, content (e.g., messages including text, images, audio, video, etc.) can be shared among users associated with user accounts of an online communication network provided by the communication platform system and may include sharing content in accordance with a user account that is restricted, such as based on a type of account; an organization associated with the user/an organization account that has authorized access of the communication platform via the organization's account; a workspace that the user has joined or to which the user was added, or the like. In some examples, the communication client application enables interfaces to access content, to view content, and to generate content as those described with reference to FIGS. 2-5C for example. In particular examples, communication platform server(s) 102 send instructions to present, transmit, and receive content and/or instructions as discussed with reference to FIGS. 2-5C. In some examples, the communication platform server(s) 102 may expose interface options that are unique to the techniques discussed herein and, in some cases, may not be otherwise available to a user, although, in other examples, the user may access the interface options through a traditional manner of using the communication platform.

In some examples, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the host communication application 116 can establish a communication channel between and among various user computing devices, allowing the user computing devices to communicate and share data between and among each other. In at least one example, the communication application 116 can manage such communications and/or sharing of data. In some examples, data associated with a communication channel can be presented via a user interface. In at least one example, the host communication application 116 can interact with the computing device(s) 104 via one or more application programing interface (API(s)) 120 to manage the generation, presentation, and/or updating of user interfaces.

In at least one example, the host communication application 116 and/or client communication application 118 can be a mobile application, a web application, a database interface (e.g., such as an application that presents a SQL or other database interface), or a desktop application, which can be provided by the communication platform or which can be an otherwise dedicated application. For example, a computing device of the one or more computing device(s) 104 may access the host communication application 116 via a web browser that communicates via network(s) 106 with API(s) 120. In some examples, computing device(s) 104 associated with the example system 100 can have an instance or versioned instance of the client communication application 118, which can be downloaded from an application store, accessible via the Internet, or otherwise executable by the processor(s) 112 to perform operations as described herein. That is, the application 118 can be an access point, enabling the user computing device(s) 104 to interact with the server(s) 102 to access and/or use communication services available via the communication platform, such as accessing the host communication application 116 and/or security component 126 via the API(s) 120. In at least one example, the client application 118 can facilitate the exchange of data between and among various other user computing devices, for example via the server(s) 102. In at least one example, the client communication application 118 may comprise instructions for causing presentation of a user interface 122, which may comprise visual, audible, and/or tactile features. A non-limiting visual representation of a general user interface 122 is illustrated in FIG. 1.

In some examples, the host communication application 116 may differ from the client communication application 118 by including or accessing one or more application programming interface(s) (API(s)) 120 for exposing back-end functions offered by the communication platform server(s) 102 to the computing device(s) 104 without transferring the functions to the computing device(s) 104 and/or accomplishing the functions at the communication platform server(s) 102. As relates to the instant discussion, this may comprise API(s) for receiving communication data from the computing device(s) 104, such as a message or any of the communication data discussed herein, and determining an embedding, identifying one or more nearest neighbors based at least in part on the techniques discussed herein, and returning an indication of one or more communication platform features or instructions associated therewith (e.g., instructions to cause a user interface 122 associated with the client communication application 118 to display an option to populate a channel or user identifier for the message that triggered the API call). For example, interaction data, interaction parameters, data structures, and/or instructions related to an identity verification process may be exchanged via the API(s) 120, according to the examples discussed herein.

In some examples, the client communication application 118 may comprise an instruction to a call an API in the examples discussed herein. For example, an identity verification component 124, which may comprise identity trust verification circuitry. The identity verification component 124 may comprise software and/or hardware that detects interaction activity at the computing device(s) 104 and may generate interaction parameter(s) based at least in part on the interaction activity. The client communication application 118 or identity verification component 124 itself may transmit (via network(s) 106) an API call comprising the interaction parameter(s) to the host communication application 116 and/or security component 126 at communication platform server(s) 102, wherein the security component 126 may comprise an identity verification component configured to detect impersonation of a user profile or other such security breaches.

The security component 126 may receive the interaction data, interaction parameter(s), etc., use the interaction parameter(s) to determine a trust score as discussed herein, and may transmit a reply to the API call comprising instructions to cause the identity verification component 124 to allow the client communication application 118 instance to be continued to be accessed at the computing device if the security component determines that the interaction activity at that device is valid according to the techniques discussed herein. Otherwise, in an instance where the security component 126 determines that activity at the computing device(s) 104 is malicious, the security component 126 may initiate an additional trust verification process by transmitting a trust verification request and/or instructions to the identity trust verification component 124, and/or close or pause communications at one or more of the API(s) in response to requests sent by one or more of the computing device(s) 104 associated with a user profile 128.

The user profile 128, additionally referred to herein as a "user account" and/or "user account details," refer to data and/or a data structure associated with a user, including, for example, a user identifier, one or more group-based communication channel identifiers associated with group-based communication channels that the user has been granted access to, one or more group identifiers for groups with which the user is associated, an indication as to whether the user is an owner or an administrator of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, a historical typing pattern associated with a user's historical typing features, a historical average typing speed associated with a user, a historical recipient list associated with historical messages or content transmitted by a client device associated with a user, a historical average download/upload data rate for the attachments associated with historical messages performed by a client device associated with a user, a historical search term list associated with a user, a historical message content retrieval or exportation rate associated with a user, a historical public or private network access record associated with a user, a historical VPN access record associated with a user, biometric data (e.g., fingerprint data, visual recognition data, facial recognition data, audio recognition data, etc.) associated with a user, and the like. The user account details can include a subset designation of user credentials, such as, for example, login information for the user including the user's username and password. In some examples, any portion or the entirety of the user profile 128 or one or more items of data with which the user profile 128 is associated may be referenced by a user identifier, which may comprise ASCII text, a pointer, a memory address, and the like.

The identity verification component 124 may additionally or alternatively receive trust verification requests from the security component 126, which may cause the identity verification 124 to pause transmissions and/or access at the client communication application 118 until input is received responsive to the trust verification request. This may comprise presenting a window overlaying the user interface 122 and disabling the functionality of some or all of the user interface 122 until the trust verification request is resolved. In some examples, a trust verification request may comprise electronic data that is generated, when an initial trust score is lower than a trust score threshold, by a group-based communication server to be transmitted to a client device and/or the identity verification component 124. The trust verification request is generated to initiate a verification process for obtaining verification responses from the client device or a verification device to verify identity of a user associated with a client device. In some examples, the trust verification request comprises one of a bot screening verification request (e.g., instructions transmitted to the client device for rendering a bot screening interface for receiving user's input, such as receiving a password, image labeling, text labeling, etc. via a keyboard, touchscreen, or clicks via a mouse provided by the client device, to differentiate a human activity from a bot activity), a periodic user verification request, a biometric user verification request (e.g., which may comprise the touch, visual, audio, etc. requests), a touch verification request (e.g., transmitting instructions to cause the client device to request or cause capture of a swiping or other touch pattern), a visual verification request (e.g., transmitting instructions to cause the client device to request or cause capture of an image to verify the user's face via face recognition), an audio verification request (e.g., requesting a sample of audio from a microphone of the client device to verify the user's identity using a voice recognition ML model), an administrator approval request (e.g., transmitting instructions to cause a client device associated with a user profile that has administrator permissions to request or cause capture of input signifying authorization to allow the activity at the client device or to quarantine the client device, user profile, or the like).

In some examples, the techniques discussed herein may be applied in addition to or instead of periodic user verification requests, which may comprise electronic data generated by a group-based communication server to be transmitted to a client device periodically for obtaining user's responses after consistent or exact time periods or amounts of input (e.g., after m number of keystrokes, after n number of messages sent, after o files are uploaded, etc., where m, n, and o are positive integers). In additional or alternative examples, the period user verification request may comprise data generated by the group-based communication server periodically whenever idle time periods are detected. In such an embodiment, the period user verification request is generated by the group-based communication server and transmitted to the client device to receive user's input to reset the idle time period calculation. The periodic user verification request may comprise, for example, sending a one-time verification pass code to an alternate device other than the first computing device periodically for user verification.

FIG. 1 further illustrates communication platform server(s) 102 as including security component 128 and machine-learned (ML) model(s) 130, which may carry out at least some of the operations discussed herein. In at least one example, the ML model(s) 130 may additionally or alternatively be stored in memory 114 of the computing device(s) 104. The communication platform server(s) 102 may additionally or alternatively include or have access to datastore 132. In at least one example, a datastore 132 can be configured to store data that is accessible, manageable, and updatable, such as communication data 134, historical interaction parameters 136, and/or data structure(s) 138 generated according to the techniques discussed herein based at least in part on comparing historical interaction parameter(s) associated with a user profile 128 to recently received interaction parameter(s) associated with the user account. For example, the datastore 132 may comprise a database such as an electronic repository used to store a collection of information, data, datasets, data objects, or data corpora that is organized and easily accessible for rapid search and retrieval. The datastore 132 may comprise a network database a database connected to a communications network that, upon receiving a query from network-connected computing devices, allows data stored in the network database to be transmitted, received, and/or retrieved in response to the query. It will be appreciated that the terms "datastore," "database," "repository," and "network database" may be used interchangeably in areas of the present disclosure.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. Moreover, data may be transmitted, received, or otherwise exchanged as individual "data objects" comprising interrelated data. Data objects may constitute single bits of data or large quantities of interrelated data, such as substantive data (e.g., the underlying content to be conveyed through a communication) and associated metadata (e.g., data not otherwise considered to be substantive data, encompassing characteristics of the substantive data and/or the relevant exchange (e.g., the identity of the user sending the data, the identity of the user receiving the data, the time/date when the data was sent, formatting to be associated with the exchanged substantive data, the file type of the data object, and/or the like).

In some examples, a query may comprise computer-executable instructions forming a request associated with a database. A query may be generated on one or more client devices via the client communication application 118, and may be transmitted to a group-based communication platform. A query may be a select query, which may be used to extract data from the database in a readable format according to the query. A query may be an action query, which may comprise a request to accomplish an operation such as insertion, deletion, and/or updating on the data stored in the datastore 132. A query may be a search query, or a search query request, which is received from a client device associated with a particular user requesting for operating a search function on a database to retrieve communication data 134.

In some examples, any content or communications that are transmitted via the communication platform may be stored in datastore 132 until deletion therefrom. In some examples, the datastore 132 can be integrated with the server(s) 102, as shown in FIG. 1. In other examples, the datastore 132 can be located remotely from the server(s) 102 and can be accessible to the server(s) 102 and/or user device(s), such as the user computing device(s) 104. The datastore 132 may comprise multiple databases, which can include communication data 134, historical interaction parameters 136, and/or data structure(s) 138, although the datastore 128 may store additional or alternative data. For example, the datastore 132 may temporarily store recently received interaction parameter(s) before a data structure is generated therefrom, according to the techniques discussed herein, and/or before or as part of storing the interaction parameter(s) as historical interaction parameters 136.

Communication data 134 may include a message, query, file (e.g., document, spreadsheet, computer code, image, video, audio, electronic contact information), mention, user or user profile, interaction (e.g., reaction, edit, deletion, prioritization such as by pinning or starring), ticket, channel, application integrated into one or more channels, conversation (e.g., group of messages that has been segmented as a single unit), workspace (e.g., a set of channels, users, projects, tasks within an organization that may have its own set of permissions; may be organized substantially in line with an organization chart in some instances), etc. that are associated with an organization's transmissions using the communication platform. Creation, selection, uploading, and/or downloading of such communication data 134 at the computing device(s) 104 may be part of the interaction activity discussed herein. As used herein, the terms "messaging communication" and "message" may comprise any electronically generated digital content object provided by a user using a client device in association with the client communication application 118 and that is configured for reproduction via an instance of the client communication application 118, e.g., served in association with a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

In some examples, the communication data 130 may comprise data associated with a user (i.e., a user profile), including, but not limited to, a user identifier, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., Alice Tyler), a username (e.g., alice_t), a password, user preferences and/or settings, a time zone, a status, a token, and the like.

In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client devices 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
                                    <password>abc123</password>
            //OPTIONAL <cookie>cookieID</cookie>
            //OPTIONAL       <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
    //it should be noted that although several client details
    //sections are provided to show example variants of client
    //sources, further messages will include only on to save
    //space
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0</app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
```

```
    <client_serial_number>YXXXXXXXXZ</client_serial_number>
    <client_UDID>FXXXXXXXXX-XXXX-XXXX-XXXX-
XXXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <message>
    <message_identifier>ID_message_10</message_identifier>
    <team_identifier>ID_team_1</team_identifier>
    <channel_identifier>ID_channel_1</channel_identifier>
    <contents>That is an interesting disclosure. I have attached a copy our patent
policy.</contents>
    <attachments>patent_policy.pdf</attachments>
  </message>
</auth_request>
```

In some embodiments, a group identifier as defined above may be associated with the message. In some examples, a group-based communication channel identifier as defined above may be associated with the message. In some embodiments, a sending user identifier as defined above may be associated with the message. In one implementation, the message may be parsed (e.g., using PHP commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message. In some examples, messages associated with a same user identifier may be retrieved and one or more topics may be determined based at least in part on the retrieved messages. These one or more topics may be associated with the message(s) and/or the user profile associated with the user identifier.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:
SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic and/or based at least in part on retrieving messages associated with a user identifier associated with the user and determining context from the retrieved messages).

In some examples, message user interfaces, such as attachments, may be included within the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some examples, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some examples, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In some examples, various metadata, determined as described above, and/or the contents of the message may be used to index the message (e.g., using the conversation primitive) to facilitate various facets of searching (i.e., search queries that return results from group-based communication datastore 132). In one implementation, a storage message may be sent from group-based communication server 102 to facilitate indexing in group-based communication datastore 132. In another implementation, metadata associated with the message may be determined and the message may be indexed in group-based communication datastore 132. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). In an additional or alternate example, historical interaction parameters 136 may be associated with a respective message and/or index. For example, interaction data/parameter(s) generated at a time associated with transmission of a message or other communication data from the computing device(s) 104 may be associated in the datastore 132 with the message. In other words, the communication data 134 and the historical interaction parameters 136 may be associated via a relational database or the like. In an additional or alternate example, at least part of the communication data 134 discussed herein (which may comprise a message, file contents, conversation primitive, etc.) may be used as part of interaction parameter(s).

If there are attachments associated with the message, file contents of the associated files may be used to index such files in group-based communication repository 107 to facilitate searching. In one embodiment, the files may be indexed such that a company's or a group's files are indexed at a separate distributed repository.

In some examples, the communication platform server(s) 102 may create a storage message based at least in part upon receiving a message to facilitate message storage in one or more databases, such as datastore 132. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting disclosure. I have attached a copy our patent
    policy.</contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In some examples, the datastore 132 may additionally or alternatively store permissions data associated with permissions of individual users of the communication platform. In some examples, permissions can be set by the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

The datastore 132 may additionally or alternatively store workspace data, which may be part of the communication data 134. In at least one example, the communication platform can be partitioned into different workspaces, which can be associated with different groups of users. Each workspace can be associated with a group identifier and one or more user identifiers can be mapped to, or otherwise associated with, the group identifier. User(s) corresponding to such user identifier(s) can be "members" of the group. A workspace may comprise one or more channels that are unique to that workspace and/or one or more channels that are shared between one or more workspaces. In some examples, workspaces can be associated with one or more organization identifiers, which can be associated with organizations or other entities associated with the communication platform. In some examples, such data can be mapped to, or otherwise associated with, other types of data in the datastore 127 (e.g., user data, permission data, channel data).

The datastore 132 may additionally or alternatively store channel data, which can be part of communication data 134. Channel data may store data associated with individual communication channels. In at least one example, the host communication application can establish a communication channel between and among various user computing devices, allowing the user computing devices to communicate and share data between and among each other. In at least one example, a communication channel identification may be assigned to a communication channel, which indicates the physical address in the datastore 128 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations. In some embodiments, each organization may set different policies for data access and retention for its data in the shared channel.

In some examples, the datastore 132 may be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like. In some examples, data shards can improve the performance of the communication platform.

In some examples, individual organizations can be associated with a database shard within the datastore 132 that stores data related to a particular organization identification. For example, a database shard may store electronic communication data associated with members of a particular organization (i.e., communication data 134), which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, a channel can be associated with a database shard within the datastore 132 that stores data related to a particular channel identification. For example, a database shard may store electronic communication data associated with the communication channel, which enables members of that particular channel to communicate and exchange data with other members of the same channel in real time or near-real time. In this example, a group or organization can be the owner of the database shard and can control where and how the related data is stored.

In various examples, the security component 126 may process interaction data and/or interaction parameter(s) generated by an identity verification component 124 running on at least one of the computing device(s) 104 associated with a user profile 128 registered with the group-based communication platform. For example, the security component 126 may comprise hardware and/or software for generating data structure(s) 138 based at least in part on the interaction parameter(s) and/or historical interaction parameters 136, as discussed in more detail below, generating a trust score based at least in part on the data structure(s) 138 (e.g., using ML model(s) 130 or as otherwise discussed herein), generating instructions to trigger a trust verification process, updating the trust score based at least in part on a response to and/or result of the trust verification process, and/or transmitting instructions to allow or disallow the computing device(s) 104 and/or user profile 128 to continue to access the host communication application 116, API(s) 120, datastore 132, client communication application 118, and/or user interface 122, etc. In some examples, the data structure(s) 138 may be an impersonation detection vector comprising an impersonation detection vector record.

In some instances, ML model(s) 130 may comprise one or more neural network layers that is learned jointly with a neural network model, Word2Vec, GloVe, t-distributed stochastic neighbor embedding (t-SNE), and/or the like and/or a clustering algorithm, such as k-means clustering, density-based spatial clustering of applications with noise (DBSCAN), HDBSCAN, mean-shift clustering, expectation-maximization (EM) clustering, etc. In some examples, the clustering algorithm may differ depending on the communication data type (e.g., message, file, reaction, search query). In some examples, an ML model discussed herein may be initially fit or trained on a training dataset (e.g., a set of examples used to fit the parameters of the model). The model can be trained on the training dataset using supervised, semi-supervised, or unsupervised learning. In at least one example, the training dataset used herein may comprise semi-supervised or supervised labels of interaction activity as being malicious or non-malicious and the training task may train the model to output the trust score, which may be a posterior probability that a set of interaction parameters is associated with malicious (or benign) activity. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network).

Communication data 130 may be used to semi-supervise training of some of the models discussed herein in some examples. For example, user input that classifies or implicitly classifies or assigns a value to data may be used as part of training data for the models discussed herein. Another user might indicate, via a reaction emoji, opened ticket, text in a thread, etc. that may cast doubt on the validity of activity at the computing device(s) 104. This semi-supervised input from another user may comprise an image label, moderation operations (e.g., moving a conversation, message, user, etc. from one channel to a different channel; merging two channels; splitting a channel into two channels), opening a ticket, reacting to a message, etc.

In some examples, the identity verification component 124 may receive instructions from the security component 126 causing the identity verification component 124 to allow the client communication application 118 to operate as before, terminate an instance of the client communication application 118 or an authentication communication session, and/or lock the client communication application 118 until further verification and/or instructions are received from the security component 126 (e.g., responsive to a password change, responsive to receiving an indication from an email that the access if valid).

In some examples, the communication platform server(s) 102 may include communication interface(s) 140 and/or computing device(s) 104 may include communication interface(s) 142. Communication interface(s) 140 and/or 142 may include one or more physical and/or logical interfaces, such as hardware and/or software components, for enabling communication with various other devices, such as over the network(s) 106 or directly. In some examples, the communication interface(s) 140 and/or 142 can facilitate communication via Websockets, Application Programming Interfaces (APIs) (e.g., using API calls), HyperText Transfer Protocols (HTTPs), etc. Additionally or alternatively the communication interface(s) 136 and/or 138 may enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with other computing device(s).

The communication platform server(s) 102 may further include input/output (I/O) device(s) 144 and/computing device(s) 104 may include I/O device(s) 146. Such I/O devices 144 and/or 146 can include a display, various user interface controls (e.g., buttons, a touch screen, keyboard, mouse, touch screen, joystick), audio speakers, connection ports, haptic or other tactile output devices, and so forth. In some instances, the identity verification 124 may detect interaction activity at the communication interface(s) 142, I/O device(s) 146, and/or display(s) 148 and generate interaction data and/or parameters based at least in part thereon.

As illustrated in FIG. 1, the user interface 122 may present data associated with one or more communication channels and, in some examples, one or more workspaces. That is, in some examples, the user interface can expose features from multiple channels, workspaces, users, and/or applications into a single user interface so that the user (e.g., of the user computing device 104) can access and/or interact with these different features and/or communicate with other users associated with the different features. In some examples, the user interface 122 may comprise a first pane associated with a first region 150 of the interface that displays channels of which the user is a member and/or direct message channels with other user(s).

Additionally or alternatively, the user interface 122 may comprise a second region 152 of the user interface 122 that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s)). In some examples, the data feed can be organized and/or is sortable by workspace, time, type of action, communication channel, user, or the like. In some examples, such data can be associated with an indication of which user (e.g., member of the communication channel) posted the message and/or performed an action.

The user interface 122 may additionally or alternatively comprise an interface element (e.g., visual display element, such as a button) for drafting a message, i.e., element 154; creating a search query, i.e., element 156; etc. Note that, although these elements are depicted as visual elements, they may be selectable or interacted with via voice, touch, gaze, I/O device output, and/or other user interactions. The client communication application 118 may include instructions to display a message drafting interface, a search query interface, or a triage ticket interface upon selection of any of these interface elements. Interaction with any of these interfaces may create an API call that includes data that may be based at least in part on the interaction with the interface. In some instances, the identity verification 124 may capture these interactions and/or data related thereto as interaction data (e.g., network address, network bandwidth, network connections, hardware type or model) and may parameterize this data as interaction parameters, which may be transmitted, in an API call, to the security component 126. This API call may be transmitted to communication platform server(s) 102 and may call functionality of the host communication application 116 and/or security component 126 via the API(s) 120. Note that although this application discusses using API calls, any other suitable method of transmitting data or a request for data and responding to such data/requests may be used, such as a publish-subscribe (pub-sub) architecture.

While FIG. 1 is provided as an example system 100 that can be used to implement techniques described herein, the techniques described and claimed are not limited to being performed by the system 100, nor is the system 100 limited to performing the techniques described herein. As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Securing a Group-Based Communication System

Figure 2:
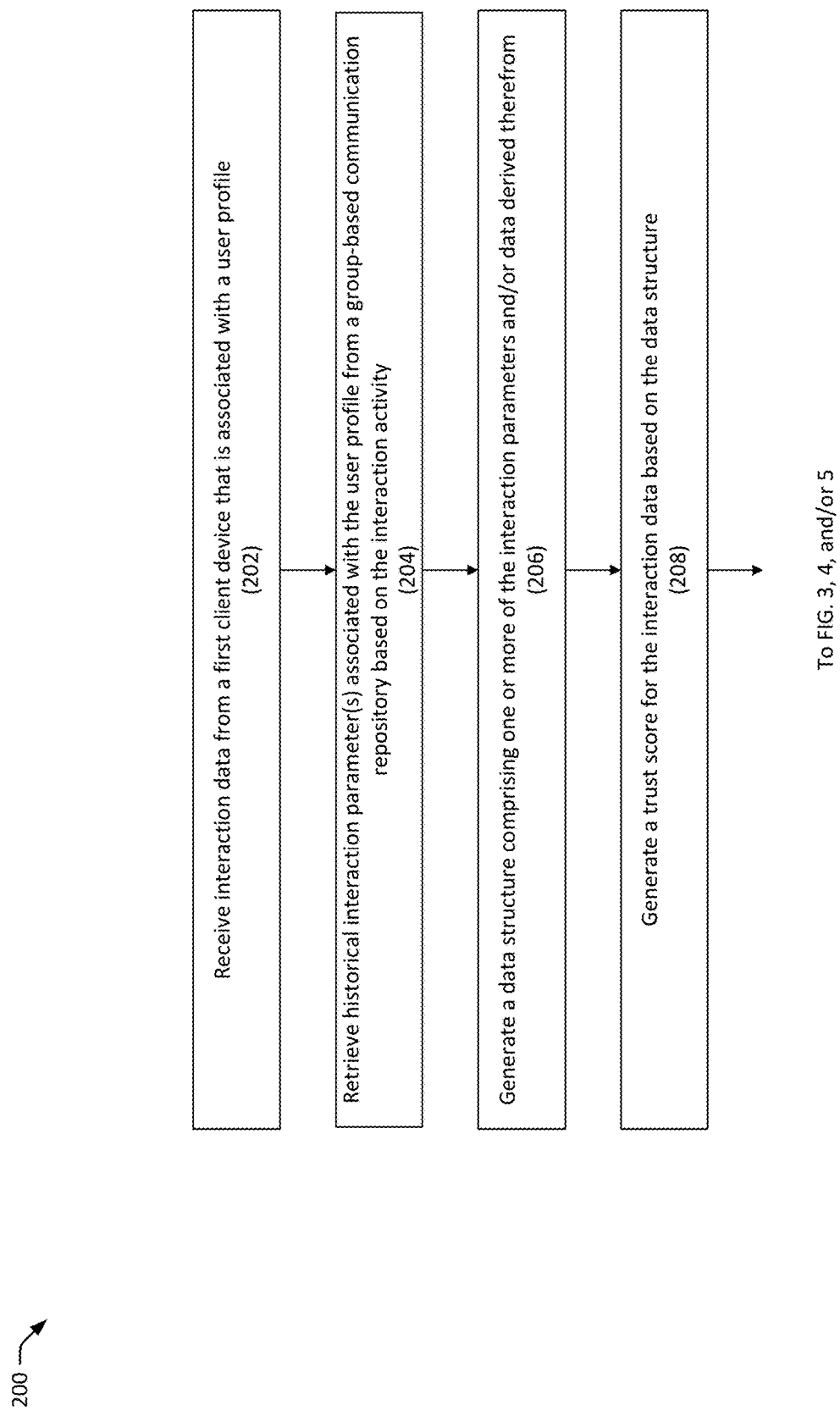
FIG. 2 illustrates a flow diagram of an example process for generating a trust score for interaction data, as described herein.

FIG. 2 illustrates a flow diagram of an example process 200 for generating a trust score for interaction data, in accordance with some embodiments of the present disclosure. In some examples, example process 200 may be accomplished by a security component 126 based at least in part on interaction data captured by an identity verification component 124 and transmitted to the security component 126.

At operation 202, example process 200 may comprise receiving interaction data from a first client device that is associated with a user profile. In some examples, the interaction data may identify a type (e.g., user touch input, remote input, voice input, message draft, search query), substance (e.g., text of a message itself, an image itself, a swiping pattern), metadata (e.g., time sent, a typing speed, a gyroscope position of the first computing device, addressees of message, encryption associated with message), and/or other attendant data (e.g., IP address of the first computing device, network speed, global location of the first computing device) associated with an interaction activity between an entity and the first client device in association with a user profile of the group-based communication system. The entity may be a person or computer that is a legitimate user associated with the user profile or an illegitimate user that has compromised the user profile/is impersonating the user associated with the user profile. In some examples, the interaction activity may comprise user input to the first client device via an input mechanism of the first client device. The input mechanism may comprise a keyboard, mouse, touch screen, camera, microphone, or the like provided by the first client device. The user input may be parsed by the first client device as instructions that are configured to cause the first client device to transmit messages to a group-based communication server; download/upload attachments associated with messages transmitted via the group-based communication server; transmit search queries to the group-based communication server; retrieve or export message content stored in the group-based communication repository via the group-based communication server; access public or private networks in communication with the group-based communication server; access a virtual private network (VPN) in communication with the group-based communication server; access a biometric scanner of the first client device to provide a biometric sample (e.g., fingerprint, image of iris, image of face); access and/or capture image data using a camera of the first client device; or access and/or capture audio data using a microphone of the first client device.

In some examples, the identity verification component 124 running on the client device may detect that interaction activity is occurring at the client device in association with the client communication application 118. For example, the identity verification component 124 may comprise a rule set or regular expression for detecting when interaction activity is occurring that the identity verification component 124 should record. Upon detection, the identity verification component 124 may generate record interaction data as interactions parameter(s) based at least in part on the interaction activity. Upon detecting the interaction activity, the identity verification component 124 may record or intercept interaction data associated with the interaction at the user device in order to generate interaction parameter(s) characterizing the interaction activity at the client device.

For example, the interaction activity may include user input to a client device via a keyboard, touchscreen, microphone, camera, and/or memory of the client device for instructing the client device to transmit a message to a group-based communication server to be communicated to a second client device. The identity verification component may generate interaction parameters identifying characteristics of and/or metadata related to the interaction activity, such as a typing pattern or an averaging typing speed detected by the client device, a recipient list comprising at least one user identifier, a channel identifier associated with a draft or transmitted message, and/or the group identifier associated with a recipient or second client device, etc. In other words, the interaction parameters describe a particular feature of the interaction activity, such as the type of interaction (e.g., typing, touch screen tap, touch screen swipe, voice input); quantifications of the activity (e.g., typing speed, touch screen swipe pattern, misspellings); etc. The interaction parameter(s) may additionally or alternatively comprise attendant metadata available at or around the time the interaction occurred, such as a network address of the client device, a time period that the client communication application 118 has been open or that the client device has been unlocked, a network upload and/or download speed, an estimated or measured position of the client device, etc. The interaction parameter(s) generated by the identity verification component 124 may be associated with the user identifier of the user profile that was active when the interaction activity occurred.

To give further examples, the interaction parameters may further characterize interaction activity related to transmitting messages to a group-based communication server to be communicated to a second client device by identifying a typing pattern, an average typing speed, an average download/upload data rate, etc. In such an example, the typing pattern captures a user's typing habits detected by a client device while the user is typing messages using a keyboard provided by the client device. The average typing speed captures the averaged typing speed detected by the client device while the user is typing messages using a keyboard provided by the client device.

For another example, when the interaction activity is related to downloading/uploading attachments associated with messages to be transmitted via a group-based communication server, the interaction parameter(s) may identify an average download/upload data rate, etc. In such an example, the average download/upload data rate captures the averaged data rate for the user to upload or download attachments to be transmitted along with the associated messages.

For another example, when the interaction activity is related to transmitting search queries to the group-based communication server, the interaction parameter(s) may identify a search term list. In such an example, the search term list may include words, phrases, terms, or symbols, etc. The search term list captures the input terms entered by the user for searching message contents.

For another example, when the interaction activity is related to retrieving or exporting message content stored in a group-based communication repository, the interaction activity features may include a message content retrieval or exportation rate. In such an example, the interaction parameter(s) may identify the data rate for the user to retrieve or export message content from the database.

For another example, when the interaction activity is related to accessing public or private networks, or a virtual private network (VPN) in communication with a group-based communication server, the interaction parameter(s) may identify a public or private network access determination or a VPN access determination. In such an example, the public or private network access determination or the VPN access determination captures the network access determination generated by the client device. The network access determination is generated for determining the level of network security to evaluate whether a further verification process is required for identity confirmation.

For another example, when the interaction activity is related to accessing a touch screen, a camera, or a microphone of a client device, the interaction parameter may include biometric data. In such an example, the biometric data (e.g., fingerprint data for identifying a user, visual recognition data for identifying a user's face, audio recognition data for identifying a user's voice) captures biometric features associated with a user using the client device.

In an additional or alternate example, interaction data and/or interaction parameter(s) may be transmitted to the security component 126 and the security component 126 may extract interaction parameter(s) from the interaction data. For example, the security component 126 may extract interaction parameter(s) identifying and/or quantifying at least one of a typing pattern detected by the first client device associated with the user; an average typing speed detected by the first client device associated with the user; a recipient list comprising one of a second user identifier, a second group-based communication channel identifier, or a second group identifier associated with messages or content to be transmitted by the first client device associated with the user; an average download/upload data rate for the attachments associated with messages performed by the first client device associated with the user; a search term list transmitted by the first client device associated with the user; a message content retrieval or exportation rate detected by the first client device associated with the user; a public or private network access determination detected by the first client device associated with the user; a VPN access determination detected by the first client device associated with the user; or biometric data comprising one of fingerprint data, visual recognition data, or audio recognition data detected by the first client device associated with the user. In some examples, an interaction parameter may be extracted from the interaction data capturing a specific feature associated with the detected interaction activity.

At operation 204, the example process 200 may comprise retrieving historical interaction parameter(s) associated with the user profile from a group-based communication repository based on the interaction activity. In some examples, a historical interaction parameter may include one or more previously received interaction parameters associated with a previous interaction activity at the client device and associated with the user profile. In some examples, the historical interaction parameter may comprise any of the data that the interaction parameter may comprise and/or trend data associated with multiple interaction parameters received over time (e.g., averages, average over window, physical locations of the client device over time). Each historical interaction parameter is retrieved from a database comprising data related to similar historical interaction activities for capturing a corresponding feature associated with historical interaction activities detected in history.

At operation 206, the example process may comprise generating a data structure comprising one or more of the interaction parameters and/or data derived therefrom. A portion of the data structure may comprise a comparison of an interaction parameter with a corresponding historical interaction parameter. For example, when the interaction activity is related to a first client device transmitting messages to a group-based communication server to be communicated to a second client device, the interaction parameters may include a recipient list that comprises one of a second user identifier, a second group-based communication channel identifier, or a second group identifier associated with the second client device. The historical interaction parameters may include a corresponding historical recipient list that comprises those user identifiers, group-based communication channel identifiers, or group identifiers associated with those client devices to which the first client device had transmitted messages. In such an example, a portion of the data structure may be generated by comparing identifiers (e.g., user identifiers, group-based communication channel identifiers, group identifiers) within the recipient list and the historical recipient list and generating an indication of any differences so as to generate a trust score for determining whether an unusual interaction activity has occurred. When the identifiers (e.g., user identifiers, group-based communication channel identifiers, or group identifiers) associated with the second client device match those within the historical recipient list, the trust score generated is likely to be high because the first client device had transmitted messages to the second client device before. When the identifiers (e.g., user identifiers, group-based communication channel identifiers, or group identifiers) associated with the second client device do not match those the historical recipient list, the trust score generated is likely to be low because the first client device had never transmitted messages to the second client device before and is likely to be suspicious.

At operation 208, the example process 200 may comprise generating a trust score for the interaction data based on the data structure. The trust score may be generated using an ML model trained to receive the data structure as input and output one or more trust scores.

Figure 3:
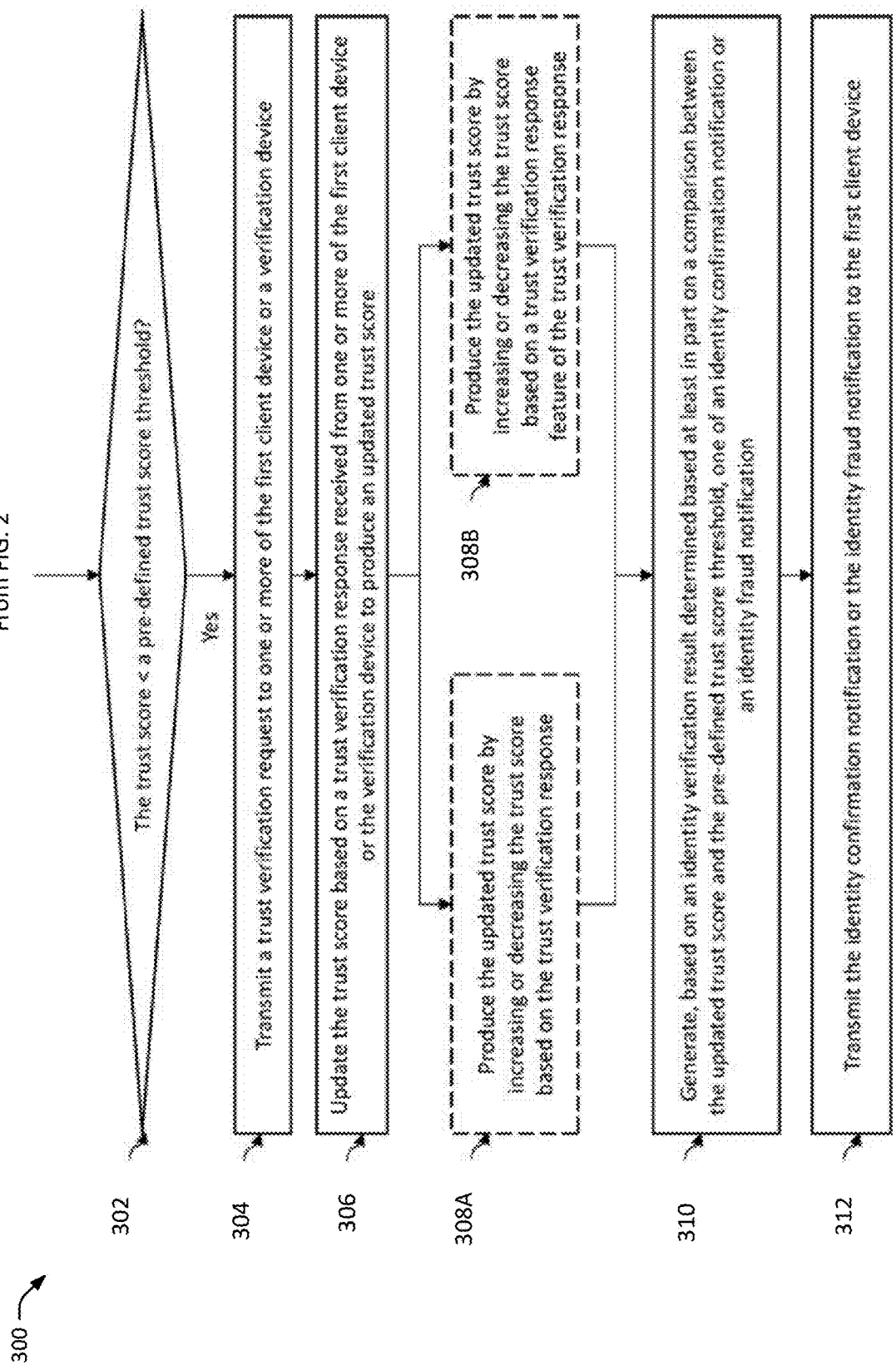
FIG. 3 illustrates a flow diagram of an example process for conducting trust verification in cooperation with one or more of a first client device or a verification device, as described herein.

FIG. 3 is an example flow chart illustrating an example method for conducting trust verification in cooperation with one or more of a first client device or a verification device, in accordance with some embodiments of the present disclosure. In some examples, example process 300 may be part of, follow, or replace at least a portion of example process 200.

At operation 302, example process 300 may comprise determining whether the trust score is below a trust score threshold. The trust score threshold may be set and adjusted by the group-based communication system based on its associated type of interaction activity.

In circumstances where the trust score is determined to be below the trust score threshold, at operation 304, the example process 300 may comprise transmitting a trust verification request to one or more of the first client device or a verification device. In some examples, the trust verification request transmitted to the first client device may comprise one or more of a bot screening verification request, a periodic user verification request, a biometric user verification request comprising one of a touch verification request, a visual verification request, or an audio verification request, etc. In some examples, the trust verification request transmitted the verification device may comprises an administrator approval request, etc.

At operation 306, example process 300 may comprise updating the trust score based on a trust verification response received from one or more of the first client device or the verification device to produce an updated trust score. In some examples, the trust verification response is generated by one or more of the first client device or the verification device in response to the trust verification request.

In an exemplary embodiment for producing the updated trust score, at operation 308A, the example process may comprise producing the updated trust score by increasing or decreasing the trust score based at least in part on the trust verification response. In an additional or alternate example for producing the updated trust score, at operation 308B, the example process 300 may comprise producing the updated trust score by increasing or decreasing the trust score based at least in part on a trust verification response feature of the trust verification response. In such an embodiment, the trust verification response feature may be a response time detected by the group-based communication server. The trust score may be increased to form an updated trust score when the detected response time is short, while the trust score may be decreased to form an updated trust score when the detected response time is long. The trust verification response feature may be a number of responding attempts. The trust score may be increased to form an updated trust score when the number of responding attempts is low, while the trust score may be decreased to form an updated trust score when the number of responding attempts is high. In some examples, one or more of other trust verification response features may be considered as factors for determining to increase or decrease the trust score.

Figure 5:
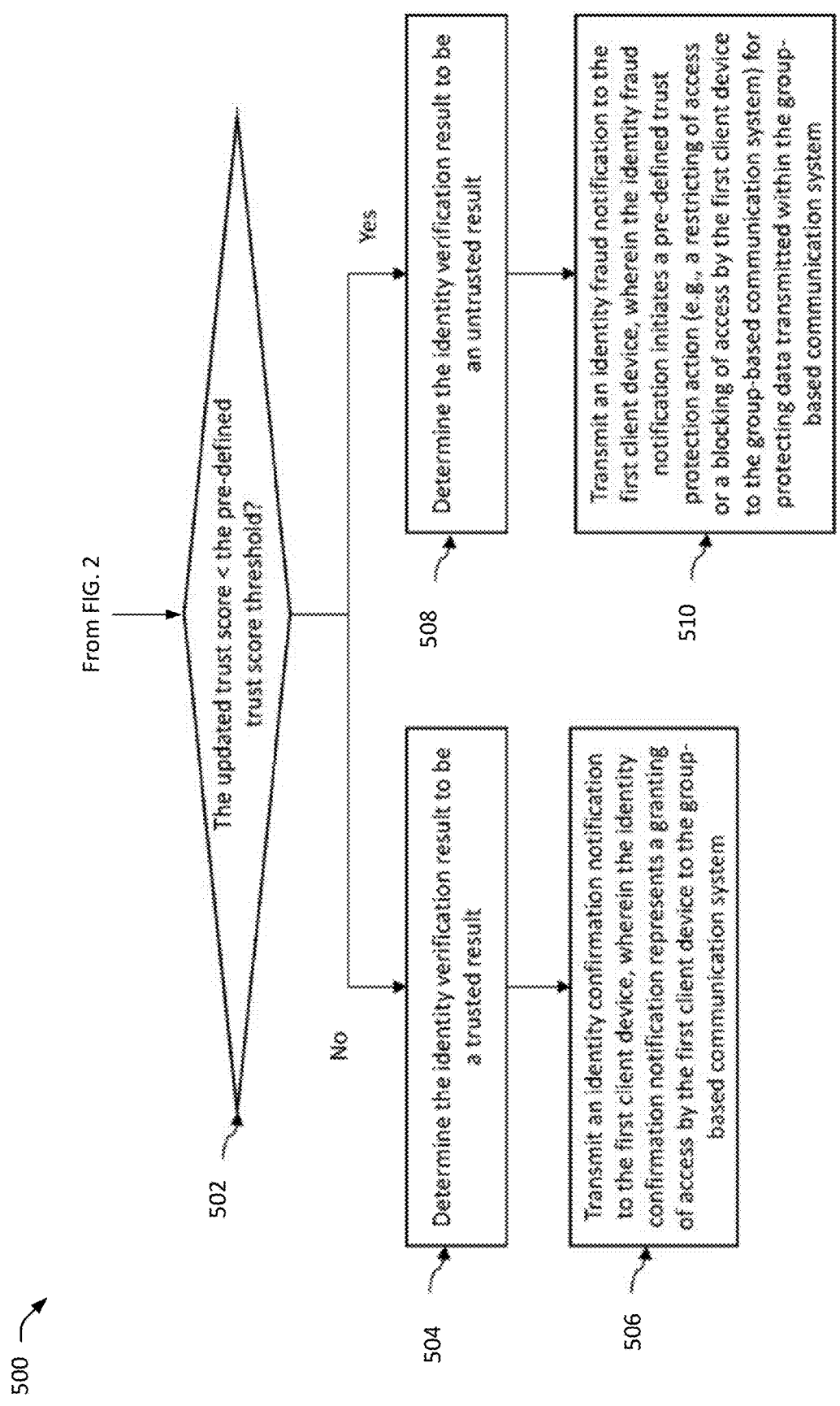
FIG. 5 illustrates a flow diagram of an example process for generating one of an identity confirmation notification or an identity fraud notification to be transmitted to a first client device based on an identity verification result, as described herein.

At operation 310, example process 300 may comprise generating, based on an identity verification result determined based at least in part on a comparison between the updated trust score and the trust score threshold, one of an identity confirmation notification or an identity fraud notification. FIG. 5 below describes the processes for determining whether to generate the identity confirmation notification or the identity fraud notification.

At operation 312, example process 312 may comprise transmitting the identity confirmation notification or the identity fraud notification to the first client device.

Figure 4:
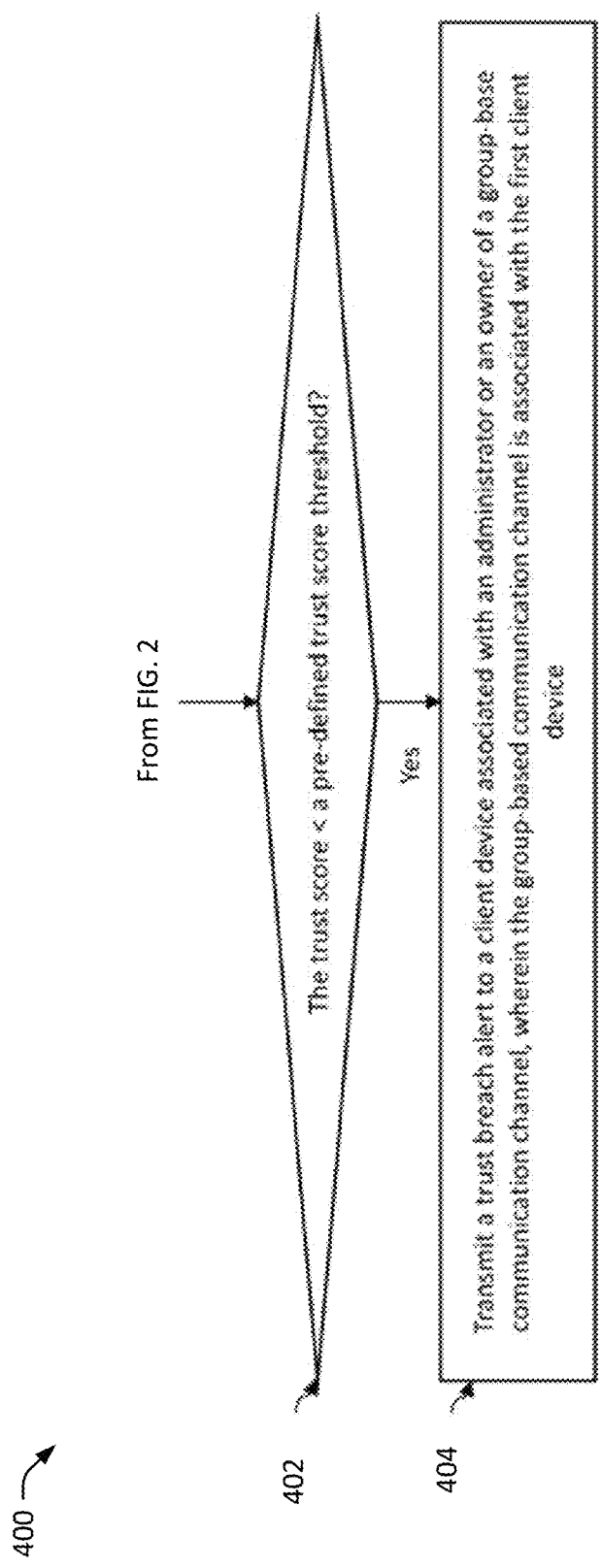
FIG. 4 illustrates a flow diagram of an example process for transmitting a trust breach alert informing a client device that is associated with an administrator or an owner of a group-based communication channel, as described herein.

FIG. 4 is an example flow chart illustrating an example method for transmitting a trust breach alert informing a client device that is associated with an administrator or an owner of a group-based communication channel, in accordance with some embodiments of the present disclosure. In some examples, example process 400 may be part of, follow, or replace at least a portion of example process 200 and/or example process 300.

At operation 402, example process 400 may comprise determining whether the trust score is below a trust score threshold. The trust score threshold may be set and adjusted by the group-based communication system based on its associated type of interaction activity.

In circumstances where the trust score is determined to be below the trust score threshold, at operation 404, example process 400 may comprise transmitting a trust breach alert to the client device that is associated with an administrator or an owner of a group-based communication channel. In such an embodiment, the group-based communication channel is associated with the first client device. The trust breach alert is transmitted to the client device for warning/notifying the administrator or the owner that the interaction activity initiated by the first client device for attempting to access the group-based communication channel is unusual and it is likely to be associated with malicious impersonation activities.

FIG. 5 is an example flow chart illustrating an example method for generating one of an identity confirmation notification or an identity fraud notification to be transmitted to a first client device based on an identity verification result, in accordance with some embodiments of the present disclosure. In some examples, example process 500 may be part of, follow, or replace at least a portion of example process 200, example process 300, and/or example process 400.

At operation 502, example process 500 may comprise determining whether the updated trust score is below the trust score threshold.

In circumstances where the updated trust score is determined to be exceeding or meeting the trust score threshold, at operation 504, example process 500 may comprise determining the identity verification result to be a trusted result. At operation 506, example process 500 may comprise transmitting an identity confirmation notification to the first client device. The identity confirmation notification represents a granting of access by the first client device to the group-based communication system.

In circumstances where the updated trust score is determined to be below the trust score threshold, at operation 508, example process 500 may comprise determining the identity verification result to be an untrusted result. At operation 510, example process 500 may comprise transmitting an identity fraud notification to the first client device based at least in part on determining that the updated trust score is below the trust score threshold. The identity fraud notification initiates a protection action for protecting data transmitted within the group-based communication channel. In some examples, the protection action may be a restricting of access or a blocking of access by the first client device to the group-based communication system.

Figure 6:
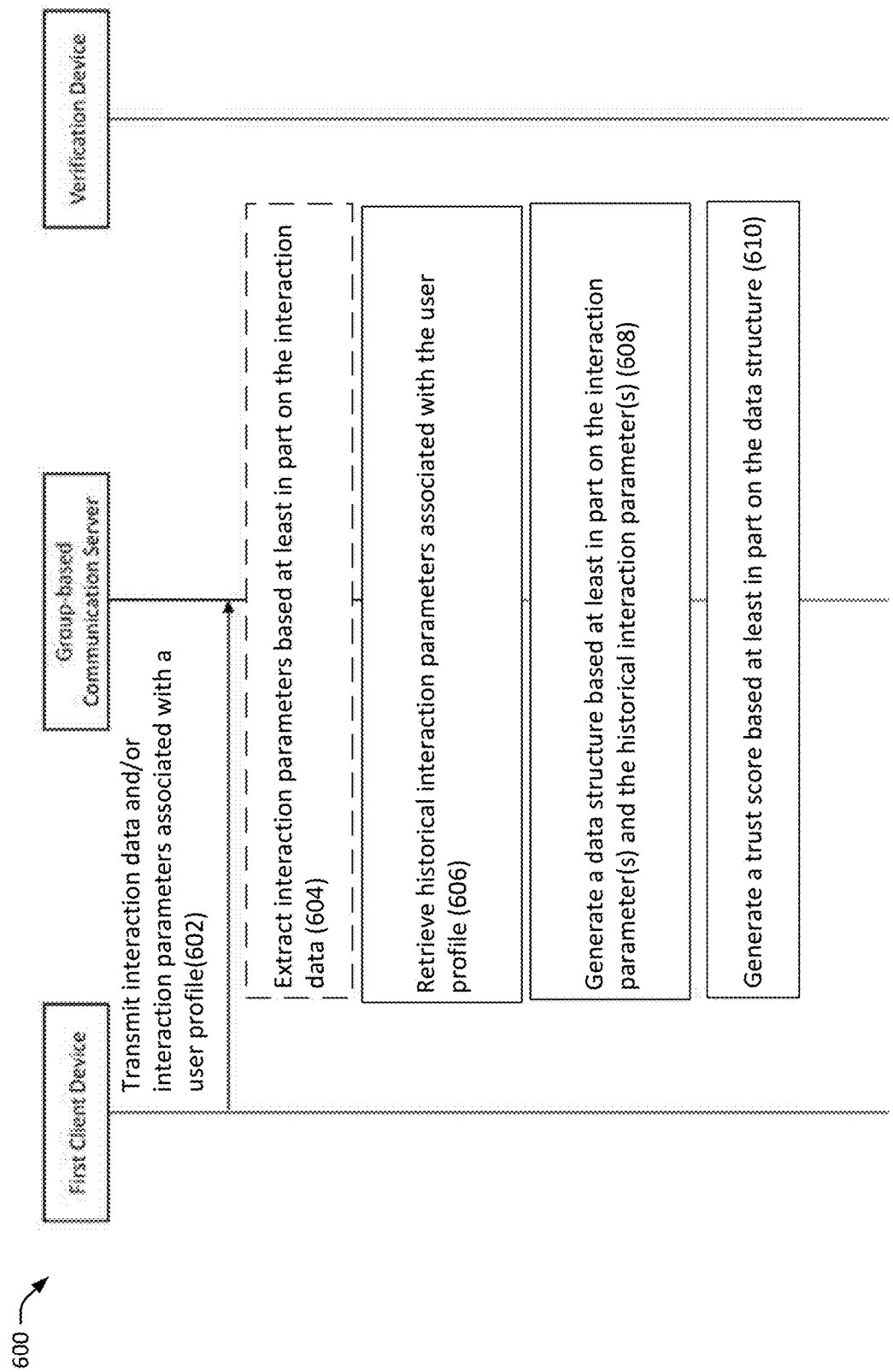
FIG. 6 illustrates a swim lane diagram of example operations for generating a trust score for interaction data, as described herein.

FIG. 6 is an example swim lane diagram illustrating example operations and/or data flow 600 for generating a trust score for interaction data, in accordance with some embodiments of the present disclosure.

At operation 602, a first client device that is associated a user profile may transmit interaction data to a group-based communication server. The interaction data representing an interaction activity between a user associated with the user profile and the first client device. In some examples, the interaction activity may comprise user input to the first client device via an input mechanism of the first client device. The input mechanism may comprise a keyboard, a mouse, the touch screen, the camera, or the microphone provided by the first client device. The user input may comprise instructions that are configured to cause the first client device to: transmit messages to a group-based communication server; download/upload attachments associated with messages transmitted via the group-based communication server; transmit search queries to the group-based communication server; retrieve or export message content stored in the group-based communication repository via the group-based communication server; access public or private networks in communication with the group-based communication server; access a virtual private network (VPN) in communication with the group-based communication server; access a touch screen of the first client device for fingerprint detection; access a camera of the first client device for visual detection; or access a microphone of the first client device for audio detection.

In some examples, the first client device may transmit the interaction data as interaction parameters extracted from the interaction data and/or may transmit the interaction parameter(s) in addition to the interaction data.

In an additional or alternate example, the group-based communication server may extract interaction parameters from the interaction data received from the first client device the interact data at operation 604, although at least in some examples the first client device may conduct this operation based at least in part on detecting an interaction activity of interest. In some examples, the interaction parameter may comprise at least one of: a typing pattern detected by the first client device associated with the user; an average typing speed detected by the first client device associated with the user; a recipient list comprising one of a second user identifier, a second group-based communication channel identifier, or a second group identifier associated with messages or content to be transmitted by the first client device associated with the user; an average download/upload data rate for the attachments associated with messages performed by the first client device associated with the user; a search term list transmitted by the first client device associated with the user; a message content retrieval or exportation rate detected by the first client device associated with the user; a public or private network access determination detected by the first client device associated with the user; a VPN access determination detected by the first client device associated with the user; or biometric data comprising one of fingerprint data, visual recognition data, or audio recognition data detected by the first client device associated with the user. Each interaction parameter is extracted from the interaction data capturing a specific feature associated with the detected interaction activity.

At operation 606, the group-based communication server may retrieve historical interaction parameters associated with the user profile from a group-based communication repository based at least in part on the interaction activity. In some examples, each historical interaction parameter is associated with a respective historical interaction parameter that are similar to the interaction activity and associated with the user profile. In some examples, the historical interaction parameter may comprises at least one of: a historical typing pattern retrieved from the user profile associated with the user; a historical average typing speed retrieved from the user profile associated with the user; a historical recipient list comprising one of a second user identifier, a second group-based communication channel identifier, or a second group identifier retrieved from the user profile associated with historical messages or content transmitted by the first client device associated with the user; a historical average download/upload data rate retrieved from the user profile for the attachments associated with historical messages performed by the first client device associated with the user; a historical search term list retrieved from the user profile associated with the user; a historical message content retrieval or exportation rate retrieved from the user profile associated with the user; a historical public or private network access record retrieved from the user profile associated with the user; a historical VPN access record retrieved from the user profile associated with the user; or biometric data comprising one of fingerprint data, visual recognition data, or audio recognition data retrieved from the user profile associated with the user. Each historical interaction parameter is retrieved from a database comprising data related to similar historical interaction activities for capturing a corresponding feature associated with historical interaction activities detected in history. In some examples, the historical parameter(s) may comprise averages or other representations of interaction parameter(s) associated with the user profile over a historical time period.

At operation 608, the group-based communication server may generate a data structure based at least in part on at least one of the interaction parameter and/or a corresponding historical interaction parameter. A portion of the data structure associated with an interaction parameter/historical interaction parameter may comprise a comparison of the interaction parameter with the corresponding historical interaction parameter. For example, when the interaction activity is related to a first client device transmitting messages to a group-based communication server to be communicated to a second client device, the extracted interaction parameters may include a recipient list that comprises one of a second user identifier, a second group-based communication channel identifier, or a second group identifier associated with the second client device. The historical interaction parameters may include a historical recipient list that comprises those user identifier, group-based communication channel identifiers, or group identifiers associated with those client devices to which the first client device had transmitted messages. In such an example, a portion of the data structure may be generated by comparing identifiers (e.g., user identifiers, group-based communication channel identifiers, or group identifiers) within the recipient list and the historical recipient list so as to generate a trust score for determining whether an unusual interaction activity has occurred. When the identifiers (e.g., user identifiers, group-based communication channel identifiers, or group identifiers) associated with the second client device match those within the historical recipient list, the trust score generated is likely to be high because the first client device had transmitted messages to the second client device before. When the identifiers (e.g., user identifiers, group-based communication channel identifiers, or group identifiers) associated with the second client device do not match those within the historical recipient list, the trust score generated is likely to be low because the first client device had never transmitted messages to the second client device before and is likely to be suspicious.

In an additional or alternate example, the portion of the data structure may comprise a difference in geolocation, a difference in IP address and/or two different IP addresses (e.g., one associated with an interaction parameter and the other associated with a historical interaction parameter), a difference in a touch pattern and/or input speed, a difference in input type, a difference in voice recognition, etc.

At operation 610, the group-based communication server may comprise generating a trust score for the interaction data based on the data structure. The trust score may be generated by an ML model trained to receive the data structure or at least a portion thereof as input and to output trust score(s). In at least one example, the ML model may be trained via a supervised technique that labels interaction parameter(s) and/or historical parameter(s) as being associated with an impersonation or as being associated with the verified user.

Figure 7:
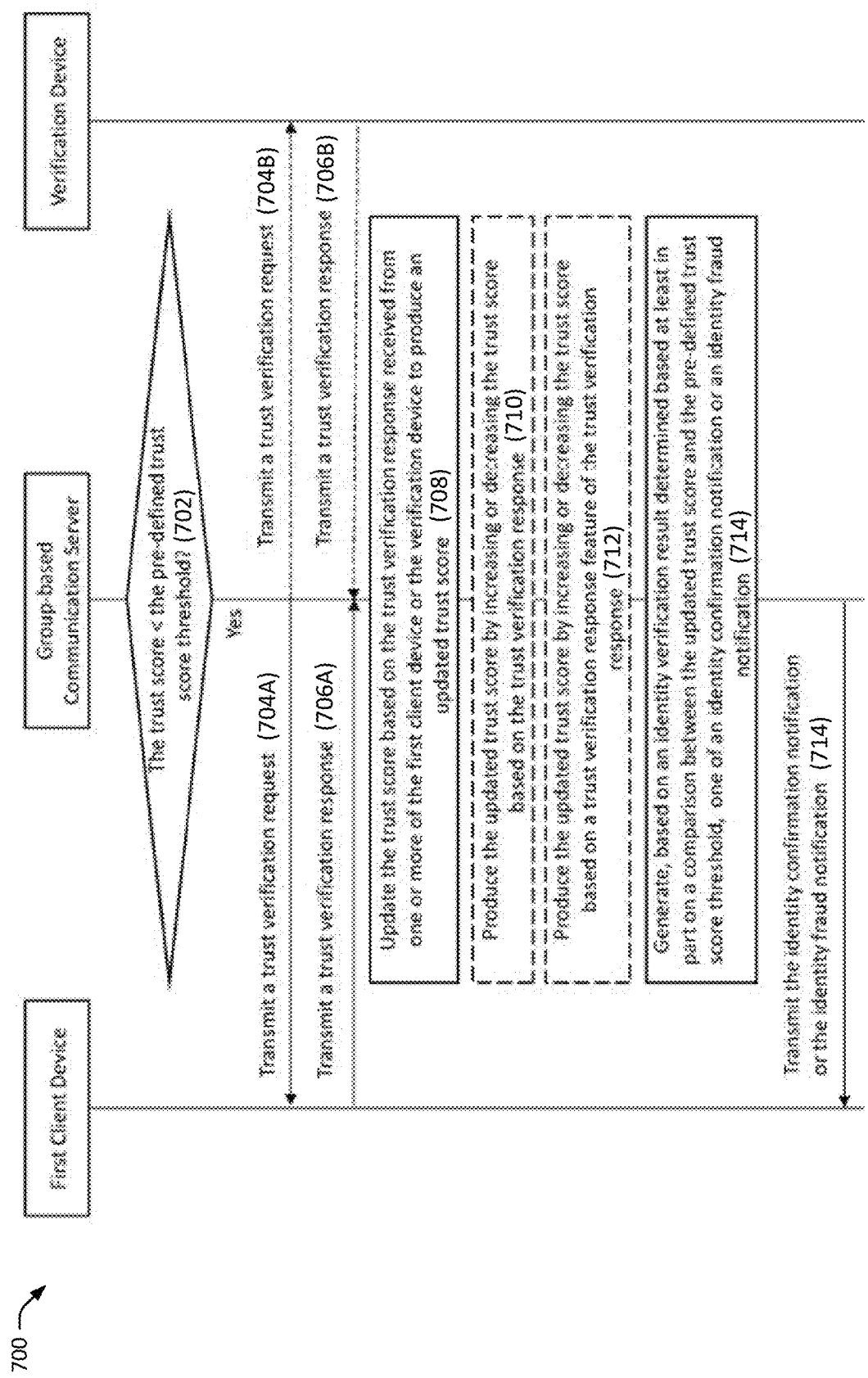
FIG. 7 illustrates a swim lane diagram of example operations for conducting trust verification in cooperation with one or more of a first client device or a verification device, as described herein.

FIG. 7 is an example swim lane diagram illustrating an example process and/or data flow 700 for conducting trust verification in cooperation with one or more of a first client device or a verification device, in accordance with some embodiments of the present disclosure. In some examples, the example process and/or data flow 700 may be a continuation of or replacement for part of example process and/or data flow 600.

At operation 702, the group-based communication server may determine whether the trust score is below a trust score threshold. The trust score may be set and adjusted by the group-based communication system based on its associated type of interaction activity.

In circumstances where the trust score is determined to be below the trust score threshold, at operations 704A and 704B, the group-based communication server may transmit a trust verification request to one or more of the first client device or a verification device. In some examples, the trust verification request transmitted to the first client device may comprise one or more of a bot screening verification request, a periodic user verification request, a biometric user verification request comprising one of a touch verification request, a visual verification request, or an audio verification request, etc. In some examples, the trust verification request transmitted the verification device may comprises an administrator approval request, etc.

At operations 706A and 706B, the group-based communication server may receive a trust verification response from one or more of the first client device or the verification device.

At operation 708, the group-based communication server continues with updating the trust score based on a trust verification response received from one or more of the first client device or the verification device to produce an updated trust score. In some examples, the trust verification response is generated by one or more of the first client device or the verification device in response to the trust verification request.

As an exemplary embodiment for producing the updated trust score, at operation 710, the group-based communication server may produce the updated trust score by increasing or decreasing the trust score based on the trust verification response.

As another exemplary embodiment for producing the updated trust score, at operation 712, the group-based communication server may produce the updated trust score by increasing or decreasing the trust score based on a trust verification response feature of the trust verification response.

Figure 9:
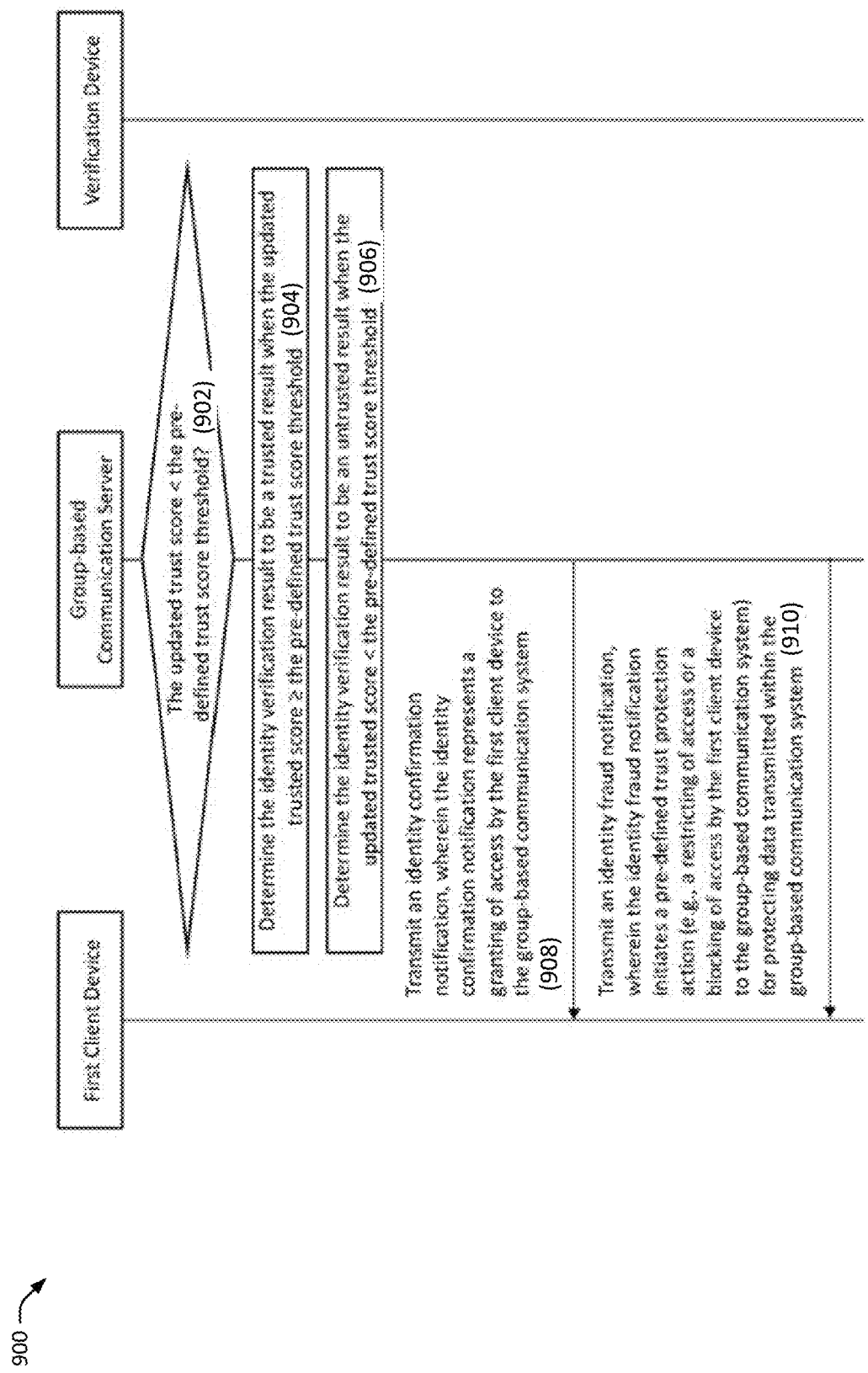
FIG. 9 illustrates a swim lane diagram of example operations for generating one of an identity confirmation notification or an identity fraud notification to be transmitted to a first client device based on an identity verification result, as described herein.

At operation 714, the group-based communication server may generate, based on an identity verification result determined based at least in part on a comparison between the updated trust score and the trust score threshold, one of an identity confirmation notification or an identity fraud notification. FIG. 9 below describes the signal diagram for determining whether to generate the identity confirmation notification or the identity fraud notification.

At operation 716, the group-based communication server may transmit the identity confirmation notification or the identity fraud notification to the first client device.

Figure 8:
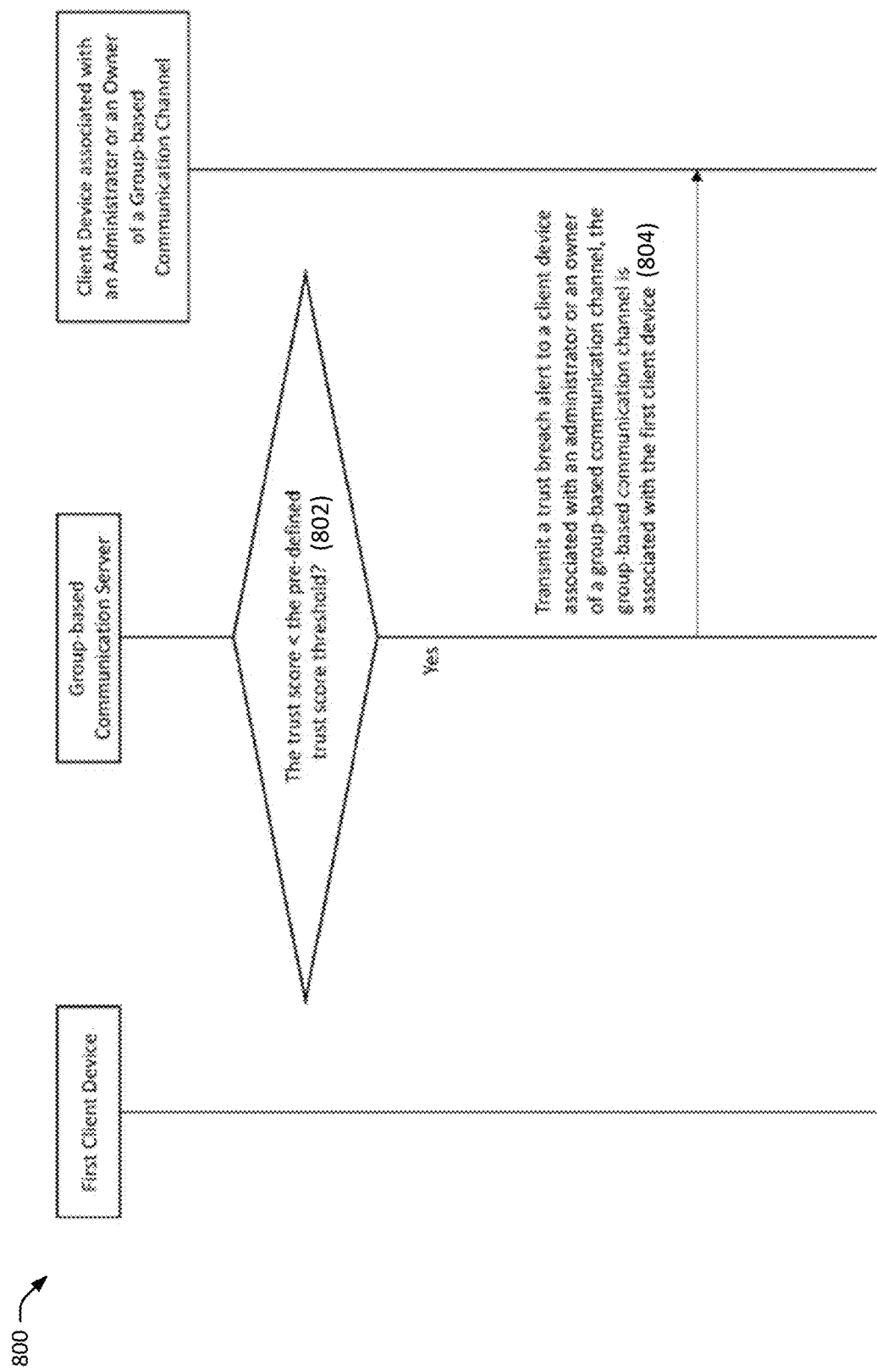
FIG. 8 illustrates a swim lane diagram of example operations for transmitting a trust breach alert informing a client device that is associated with an administrator or an owner of a group-based communication channel, as described herein.

FIG. 8 is an example swim lane diagram illustrating an example process and/or data flow 800 for transmitting a trust breach alert informing a client device that is associated with an administrator or an owner of a group-based communication channel, in accordance with some embodiments of the present disclosure. In some examples, the example process and/or data flow 700 may be a continuation of or replacement for part of example process and/or data flow 600 and/or example process and/or data flow 700.

At operation 802, the group-based communication server may determine whether the trust score is below a trust score threshold. The trust score may be set and adjusted by the group-based communication system based on its associated type of interaction activity.

In circumstances where the trust score is determined to be below the trust score threshold, at operations 804, the group-based communication server may transmit a trust breach alert to a client device that is associated with an administrator or an owner of a group-based communication channel. In such an embodiment, the group-based communication channel is associated with the first client device. The trust breach alert is transmitted to the client device for warning/notifying the administrator or the owner that the interaction activity initiated by the first client device for attempting to access the group-based communication channel is unusual and it is likely to be associated with malicious impersonation activities.

FIG. 9 is an example swim lane diagram illustrating an example process and/or data flow 900 for generating one of an identity confirmation notification or an identity fraud notification to be transmitted to a first client device based on an identity verification result, in accordance with some embodiments of the present disclosure. In some examples, the example process and/or data flow 700 may be a continuation of or replacement for part of example process and/or data flow 60, example process and/or data flow 700, and/or example process and/or data flow 800.

At operation 902, a group-based communication server may determine whether the updated trust score is below the trust score threshold.

In circumstances where the updated trust score is determined to be exceeding or meeting the trust score threshold, at operation 902, the group-based communication server may determine the identity verification result to be a trusted result. Following operation 902, at operation 904, the group-based communication server continues with transmitting an identity confirmation notification to the first client device. The identity confirmation notification represents a granting of access by the first client device to the group-based communication system.

In circumstances where the updated trust score is determined to be below the trust score threshold, at operation 904, the group-based communication server may determine the identity verification result to be an untrusted result. At operation 906, the group-based communication server may transmit an identity fraud notification to the first client device based at least in part on determining that the identity verification result is an untrusted result. The identity fraud notification is generated by the group-based communication server for initiating a protection actions for protecting data transmitted within the group-based communication system. In some examples, the protection actions may be a restricting of access or a blocking of access by the first client device to the group-based communication system.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

What is claimed is:

1. An apparatus comprising:
one or more processors; and
a memory storing processor-executable instructions that, when executed by the one or more processors, cause the apparatus to perform operations comprising:
receiving, from a first client device associated with a user profile, an interaction parameter, the interaction parameter identifying an interaction activity between a user and the first client device;
retrieving a historical interaction parameter associated with the user profile from a group-based communication repository based at least in part on the interaction activity, the historical interaction parameter being associated with the user profile and an interaction type associated with the interaction parameter;
generating a data structure, the data structure comprising a portion associated with a comparison of the interaction parameter to the historical interaction parameter; and
generating a trust score for the interaction activity based at least in part on the data structure, wherein the trust score indicates a likelihood that the interaction activity is verified user activity.

2. The apparatus of claim 1, wherein the likelihood inversely indicates that the interaction activity is associated with user impersonation and the operations further comprise:
determining that the trust score is below a trust score threshold associated with the interaction activity,
transmitting a trust verification request to one or more of the first client device or a verification device based at least in part on determining that the trust score is below the trust score threshold;
updating the trust score to produce an updated trust score based at least in part on receiving a trust verification response from one or more of the first client device or a verification device; and
generating, based at least in part on the updated trust score the trust score threshold, at least one of an identity confirmation notification or an identity fraud notification.

3. The apparatus of claim 2, wherein the operations further comprise:
determining that the updated trust score meets or exceeds the trust score threshold; and
transmitting the identity confirmation notification to at least one of the first client device or a group-based communication system, wherein the identity confirmation notification causes at least one of the first client device or the group-based communication system to grant the first client device access to the group-based communication system.

4. The apparatus of claim 2, wherein the operations further comprise:
determining that the updated trust score is below the trust score threshold; and
transmitting the identity fraud notification to at least one of the first client device or a group-based communication system, wherein the identity fraud notification initiates a protection action for protecting data transmitted within the group-based communication system.

5. The apparatus of claim 1, wherein the interaction activity comprises user input to the first client device via an input mechanism of the first client device, the user input comprising instructions configured to cause the first client device to at least one of:
transmit a message to a group-based communication server;
download or upload a file associated with a message transmitted via the group-based communication server;
transmit a search query to the group-based communication server;
retrieve or export message content stored in the group-based communication repository via the group-based communication server;
access a network in communication with the group-based communication server; or
access an input device of the first client device for biometric data.

6. The apparatus of claim 1, wherein generating the trust score comprises:
providing the data structure as input to a machine-learned model; and
receiving, from the machine-learned model, the trust score.

7. A non-transitory computer-readable medium storing computer-executable instructions that, when executed by one or more processors, cause the one or more processors to perform operations comprising:
receiving, from a first client device associated with a user profile, an interaction parameter, the interaction parameter identifying an interaction activity between a user and the first client device;
retrieving a historical interaction parameter associated with the user profile from a group-based communication repository based at least in part on the interaction activity, the historical interaction parameter being associated with the user profile and an interaction type associated with the interaction parameter;
generating a data structure, the data structure comprising a portion associated with a comparison of the interaction parameter to the historical interaction parameter; and
generating a trust score for the interaction activity based at least in part on the data structure, wherein the trust score indicates a likelihood that the interaction activity is verified user activity.

8. The non-transitory computer-readable medium of claim 7, wherein the likelihood inversely indicates that the interaction activity is associated with user impersonation and the operations further comprise:
determining that the trust score is below a trust score threshold associated with the interaction activity,
transmitting a trust verification request to one or more of the first client device or a verification device based at least in part on determining that the trust score is below the trust score threshold;
updating the trust score to produce an updated trust score based at least in part on receiving a trust verification response from one or more of the first client device or a verification device; and
generating, based at least in part on the updated trust score the trust score threshold, at least one of an identity confirmation notification or an identity fraud notification.

9. The non-transitory computer-readable medium of claim 8, wherein the operations further comprise:
determining that the updated trust score meets or exceeds the trust score threshold; and transmitting the identity confirmation notification to at least one of the first client device or a group-based communication system, wherein the identity confirmation notification causes at least one of the first client device or the group-based communication system to grant the first client device access to the group-based communication system.

10. The non-transitory computer-readable medium of claim 8, wherein the operations further comprise:
   determining that the updated trust score is below the trust score threshold; and
   transmitting the identity fraud notification to at least one of the first client device or a group-based communication system, wherein the identity fraud notification initiates a protection action for protecting data transmitted within the group-based communication system.

11. The non-transitory computer-readable medium of claim 7, wherein the interaction activity comprises user input to the first client device via an input mechanism of the first client device, the user input comprises instructions configured to cause the first client device to at least one of:
   transmit a message to a group-based communication server;
   download or upload a file associated with a message transmitted via the group-based communication server;
   transmit a search query to the group-based communication server;
   retrieve or export message content stored in the group-based communication repository via the group-based communication server;
   access a network in communication with the group-based communication server; or
   access an input device of the first client device for biometric data.

12. The non-transitory computer-readable medium of claim 7, wherein generating the trust score comprises:
   providing the data structure as input to a machine-learned model; and
   receiving, from the machine-learned model, the trust score.

13. The non-transitory computer-readable medium of claim 7, wherein the interaction parameter identifies at least one of: a typing pattern, an average typing speed, a recipient list, an average download/upload data speed or amount, a search term list, a message content retrieval or exportation rate, a public or private network access determination, a virtual private network (VPN) access determination, or biometric data.

14. A method comprising:
   receiving, from a first client device associated with a user profile, an interaction parameter, the interaction parameter identifying an interaction activity between a user and the first client device;
   retrieving a historical interaction parameter associated with the user profile from a group-based communication repository based at least in part on the interaction activity, the historical interaction parameter being associated with the user profile and an interaction type associated with the interaction parameter;
   generating a data structure, the data structure comprising a portion associated with a comparison of the interaction parameter to the historical interaction parameter; and
   generating a trust score for the interaction activity based at least in part on the data structure, wherein the trust score indicates a likelihood that the interaction activity is verified user activity.

15. The method of claim 14, wherein the likelihood inversely indicates that the interaction activity is associated with user impersonation and the method further comprises:
   determining that the trust score is below a trust score threshold associated with the interaction activity,
   transmitting a trust verification request to one or more of the first client device or a verification device based at least in part on determining that the trust score is below the trust score threshold;
   updating the trust score to produce an updated trust score based at least in part on receiving a trust verification response from one or more of the first client device or a verification device; and
   generating, based at least in part on the updated trust score the trust score threshold, at least one of an identity confirmation notification or an identity fraud notification.

16. The method of claim 15, wherein the method further comprises:
   determining that the updated trust score meets or exceeds the trust score threshold; and
   transmitting the identity confirmation notification to at least one of the first client device or a group-based communication system, wherein the identity confirmation notification causes at least one of the first client device or the group-based communication system to grant the first client device access to the group-based communication system.

17. The method of claim 15, wherein the method further comprises:
   determining that the updated trust score is below the trust score threshold; and
   transmitting the identity fraud notification to at least one of the first client device or a group-based communication system, wherein the identity fraud notification initiates a protection action for protecting data transmitted within the group-based communication system.

18. The method of claim 14, wherein the interaction activity comprises user input to the first client device via an input mechanism of the first client device, the user input comprising instructions configured to cause the first client device to at least one of:
   transmit a message to a group-based communication server;
   download or upload a file associated with a message transmitted via the group-based communication server;
   transmit a search query to the group-based communication server;
   retrieve or export message content stored in the group-based communication repository via the group-based communication server;
   access a network in communication with the group-based communication server; or
   access an input device of the first client device for biometric data.

19. The method of claim 14, wherein the interaction parameter identifies at least one of: a typing pattern, an average typing speed, a recipient list, an average download/upload data speed or amount, a search term list, a message content retrieval or exportation rate, a public or private network access determination, a virtual private network (VPN) access determination, or biometric data.

20. The method of claim 14, wherein generating the trust score comprises:
   providing the data structure as input to a machine-learned model; and
   receiving, from the machine-learned model, the trust score.

* * * * *